(12) United States Patent
Zambrano et al.

(10) Patent No.: US 9,908,710 B2
(45) Date of Patent: Mar. 6, 2018

(54) MAGNETIC CONVEYOR BELT MODULE

(71) Applicant: Laitram, L.L.C., Harahan, LA (US)

(72) Inventors: Krissie K. Zambrano, New Orleans, LA (US); Adam E. Bannerman, Mandeville, LA (US); John de St. Germain, Ponchatoula, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/479,607

(22) Filed: Apr. 5, 2017

(65) Prior Publication Data

US 2017/0291769 A1 Oct. 12, 2017

Related U.S. Application Data

(60) Provisional application No. 62/318,836, filed on Apr. 6, 2016, provisional application No. 62/397,590, filed on Sep. 21, 2016.

(51) Int. Cl.
*B65G 17/46* (2006.01)
*B65G 21/20* (2006.01)

(52) U.S. Cl.
CPC ......... *B65G 17/46* (2013.01); *B65G 21/2018* (2013.01)

(58) Field of Classification Search
CPC ........ B65G 17/46; B65G 17/08; B65G 15/58; B65G 21/2017; B65G 21/2018
See application file for complete search history.

(56) References Cited

U.S. PATENT DOCUMENTS

| | | | | |
|---|---|---|---|---|
| 4,586,601 A | * | 5/1986 | Hodlewsky | B65G 17/46 198/690.1 |
| 5,127,515 A | | 7/1992 | Damkjaer | |
| 6,343,689 B1 | * | 2/2002 | Garbagnati | B65G 17/08 198/853 |
| 6,814,216 B2 | * | 11/2004 | Veit | B07C 5/362 198/370.02 |
| 7,762,386 B2 | * | 7/2010 | Allore | B65G 17/46 198/472.1 |
| 8,210,343 B2 | * | 7/2012 | Lykkegaard | H02K 41/031 198/805 |
| 8,695,784 B2 | * | 4/2014 | Ota | B65G 15/32 198/459.6 |

(Continued)

FOREIGN PATENT DOCUMENTS

| | | |
|---|---|---|
| JP | 06-329224 A | 11/1994 |
| WO | 2015048642 A1 | 4/2015 |

(Continued)

OTHER PUBLICATIONS

International Search Report and Written Opinion of the International Searching Authority, PCT/US2017/026080, dated Jun. 28, 2017, Korean Intellectual Property Office, Republic of Korea.

*Primary Examiner* — Leslie A Nicholson, III
*Assistant Examiner* — Keith R Campbell
(74) *Attorney, Agent, or Firm* — Catherine M. Bishop

(57) ABSTRACT

A magnetic conveyor belt module integrates a magnetic element into the body of the module to attract conveyed articles to the body. A magnet seat below the top surface of the body seats the magnetic element, so that the magnetic element is between the top surface and bottom surface of the module body. A retainer engages the magnet seat to retain the magnetic element in the seat.

13 Claims, 15 Drawing Sheets

(56) References Cited

U.S. PATENT DOCUMENTS

| | | | | |
|---|---|---|---|---|
| 8,863,943 B2 * | 10/2014 | Miyashita | ............... | B65G 15/32 |
| | | | | 198/850 |
| 8,939,279 B2 * | 1/2015 | Porter | .................... | B65G 15/30 |
| | | | | 198/779 |
| 8,944,241 B2 * | 2/2015 | Ozaki | .................... | B65G 17/46 |
| | | | | 198/690.1 |
| 2006/0191774 A1 | 8/2006 | Verduijn et al. | | |
| 2012/0073938 A1 | 3/2012 | Ozaki et al. | | |
| 2017/0073165 A1 * | 3/2017 | Soderstrom | ............ | B65G 17/46 |
| 2017/0088356 A1 * | 3/2017 | Lucchi | .................... | B65G 17/34 |
| 2017/0144839 A1 * | 5/2017 | Bogle | .................... | B65G 17/46 |

FOREIGN PATENT DOCUMENTS

| | | | | |
|---|---|---|---|---|
| WO | WO 2015048642 A1 * | 4/2015 | ............ | B65G 17/40 |
| WO | WO-2015048642 A1 * | 4/2015 | ............ | B65G 17/40 |

* cited by examiner

MAGNETIC CONVEYOR BELT MODULE

RELATED APPLICATIONS

The present application claims priority to U.S. Provisional Patent Application No. 62/318,836 entitled "Magnetic Conveyor Belt Module", filed Apr. 6, 2016 and U.S. Provisional Patent Application No. 62/397,590, entitled "Magnetic Conveyor Belt Module", filed Sep. 21, 2016. The contents of both applications are herein incorporated by reference.

BACKGROUND OF THE INVENTION

The invention relates generally to power-driven conveyors and more particularly to modular plastic conveyor belts with metal-attracting or ferro-magnetic properties.

Conveyors are often used to transport items. To convey metal or magnetically attractable items, such as bakery pans, conveyors have been used that include magnetic elements to retain the magnetically-attractive items on the conveyor. Integrating the magnetic elements into the conveyor may be cumbersome.

Modular plastic conveyor belts are widely used in various industries to convey products. Modular plastic conveyor belts are constructed of a series of rows of belt modules linked together to form an endless conveyor belt loop.

SUMMARY OF THE INVENTION

A magnetic conveyor belt module comprises a main body, a magnetic element and a holder or cover for a magnetic element coupled to the main body. The module allows a magnetic element to be easily and removably integrated with the module. A magnet carrier or cover couples to the module body to sandwich the magnetic element between the bottom side of the module body and the top surface of the module body. In one embodiment, the magnet cover includes a hold-down tab. An embodiment of a magnet cover includes a hinge opening that aligns with a hinge opening in the module body to form a hinge passageway for receiving a hinge rod to secure the magnet cover to the module body.

According to one aspect, a conveyor belt module comprises a top deck, a magnetic element inserted in a seat in the top deck and a retainer for retaining the magnetic element in the seat. The top deck extends longitudinally in the direction of belt travel from a first end to a second end, laterally from a first edge to a second edge and in thickness from a top surface to an opposite bottom surface. The seat is formed below the top surface.

According to another aspect, a conveyor belt module comprises a top deck extending longitudinally in a direction of belt travel from a first end to a second end, laterally from a first edge to a second edge and in thickness from a top surface to an opposite bottom surface, a link element extending from the top deck and including a first hinge opening for receiving a hinge rod. The module further comprises a magnet cover coupled to the link element and including a second hinge opening aligned with the first hinge opening to form a hinge passageway. A magnetic element is sandwiched between the top deck and the magnet cover. A hinge rod inserted in the hinge passageway secures the magnet cover relative to the top deck.

According to another aspect, a conveyor belt module comprises a top deck extending longitudinally in a direction of belt travel from a first end to a second end, laterally from a first edge to a second edge and in thickness from a top surface to an opposite bottom surface, a slot extending laterally into the top deck from the first edge below the top surface, a magnetic element inserted in the slot and a self-retaining retainer inserted in the slot for preventing escape of the magnetic element from the slot.

According to another aspect, a conveyor belt module comprises a top deck extending longitudinally in a direction of belt travel from a first end to a second end, laterally from a first edge to a second edge and in thickness from a top surface to an opposite bottom surface. A slot extends laterally into the top deck from the first edge below the top surface. A magnet carrier including a magnetic element seated therein is inserted in the slot. The module further includes a retainer for retaining the magnet carrier in the slot.

BRIEF DESCRIPTION OF THE DRAWINGS

These features and aspects of the invention, as well as its advantages, are better understood by referring to the following description, appended claims, and accompanying drawings, in which:

DETAILED DESCRIPTION OF THE INVENTION

Figure 1:
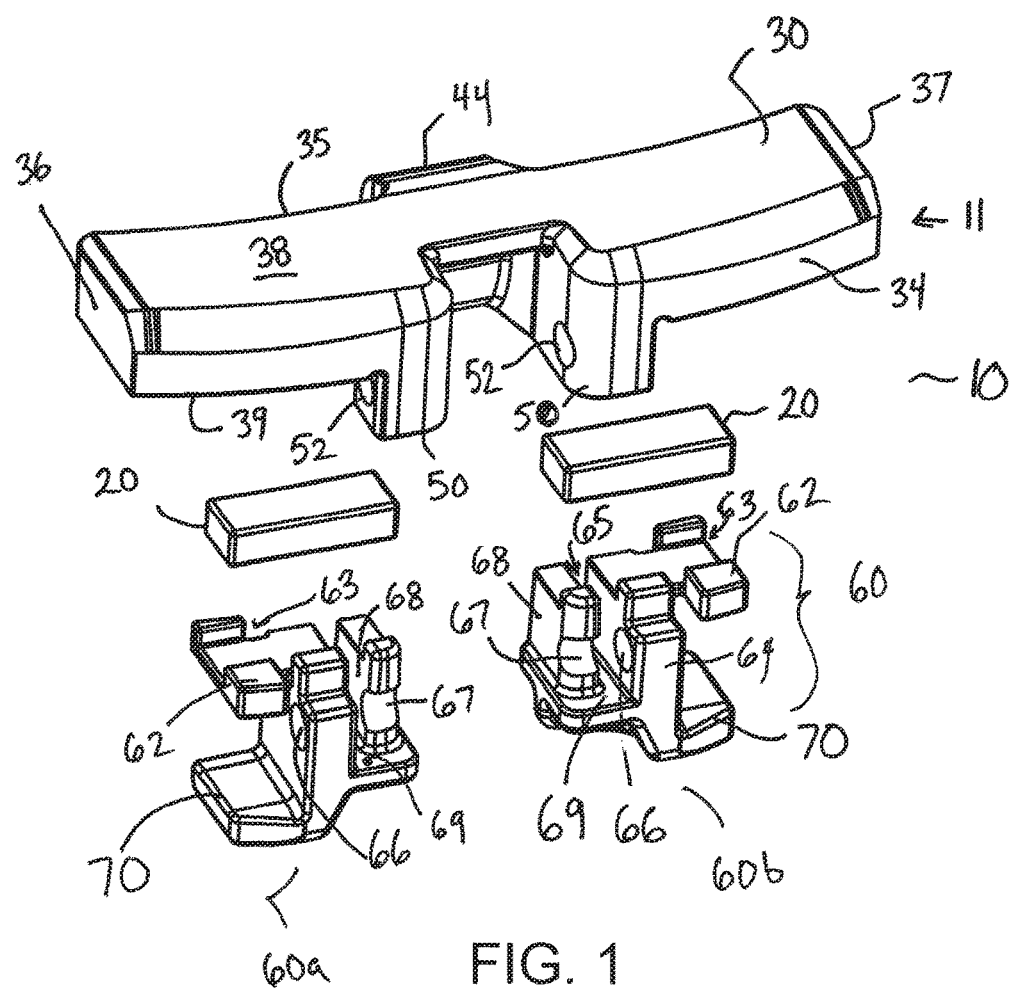
FIG. 1 is an exploded view of a magnetic conveyor belt module according to an illustrative embodiment of the invention.
Figure 2:
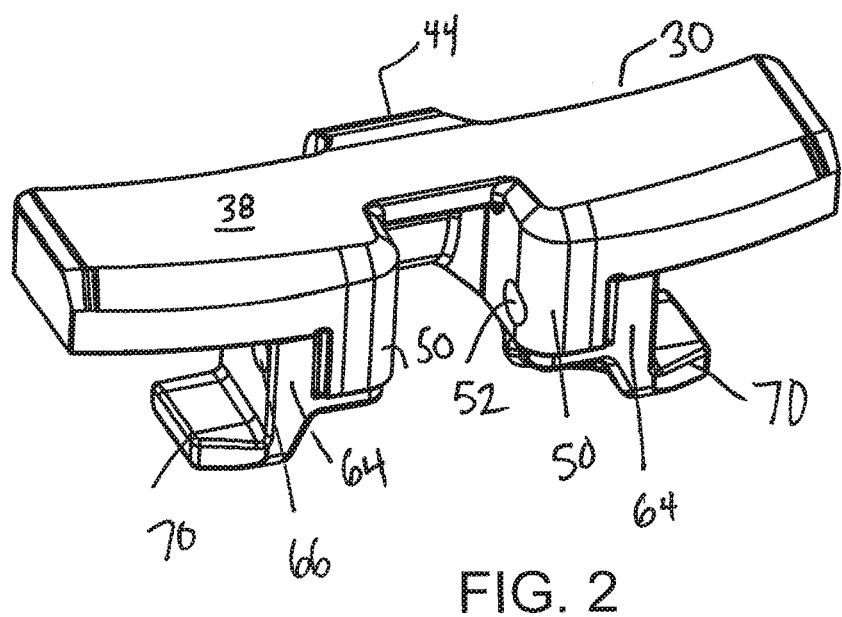
FIG. 2 is an isometric assembled view of the magnetic conveyor belt module of FIG. 1.
Figure 3:
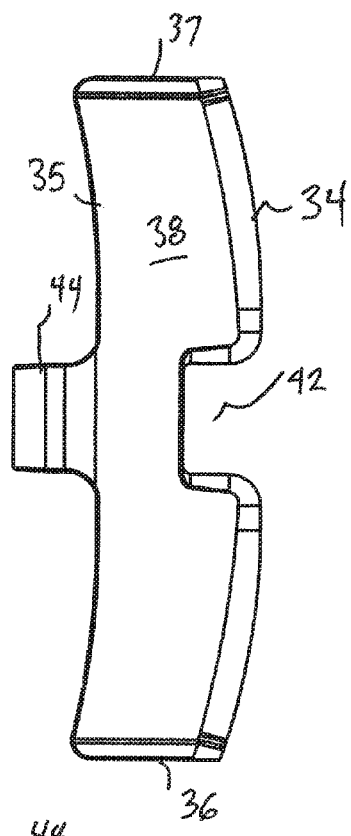
FIG. 3 is a top view of the magnetic conveyor belt module of FIG. 2.
Figures 4, 5:
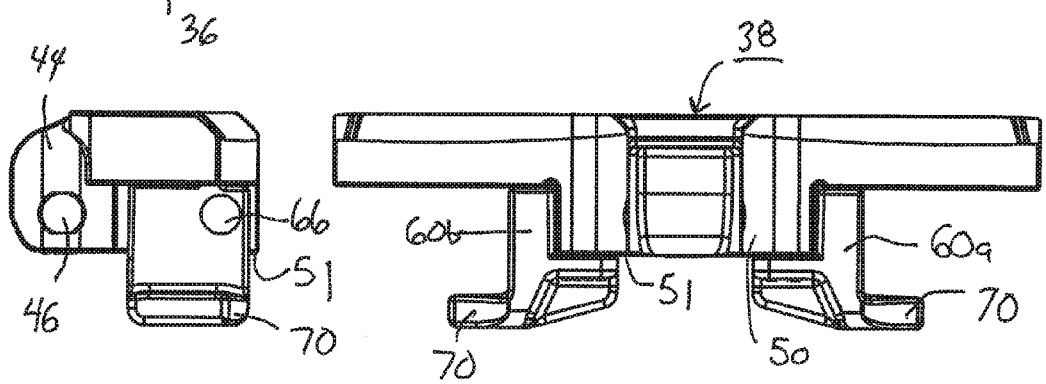
FIG. 4 is a side view of the magnetic conveyor belt module of FIG. 2.
FIG. 5 is a front view of the magnetic conveyor belt module of FIG. 2.

A conveyor belt formed of a plurality of linked modules integrates a magnetic element to attract conveyed articles against the conveying surface of the conveyor belt. The invention will be described below relative to certain illustrative embodiments, though those skilled in the art will recognize that the invention is not limited to the described embodiments.

FIGS. 1-5 show an embodiment of a magnetic conveyor belt module 10 (also known as a "link") suitable for forming a conveyor belt (also known as a "chain"). The module 10 integrates a magnetic element 20 to facilitate conveyance of magnetically-attractive items. The illustrative module comprises a main body 11, magnetic elements 20 coupled to the bottom of the main body and one or more hold-down tab portions 60 forming magnet covers for securing the magnetic elements 20 within a magnet seat formed in the main body 11. The illustrative magnetic conveyor belt module 10 can be used to form a radius or sideflexing conveyor belt, though the invention is not so limited. Multiple conveyor belt modules may run side-by-side at the same, or different speeds. For example, side-by-side belts or modules may run at different speeds to turn an object on the conveyor, such as pans in bakeries.

The main body 11 includes a generally planar top deck 30, and front and rear linking portions 50, 44. The top deck 30 extends longitudinally from a first end 34 to a second end 35. The longitudinal direction is the direction of belt travel when such a module is built into a modular conveyor belt. The module deck 30 extends laterally from a first edge 36 to a second edge 37. In thickness, the module deck extends from an upper surface 38, which forms the conveying surface on which conveyed articles are carried, to an opposite surface 39. The bottom surface 39 may include recesses or other features.

Adjacent modules may be linked together to form a conveyor belt using linking portions. The second end 35 of the deck 30 forms a trailing linking portion 44 extending back and down from the upper surface 38 at the rear end 35. The illustrative trailing linking portion 44 is at the center of the second end, but the invention is not limited to the location, configuration and number of linking portions. The front end 34 of the deck 30 is chamfered and includes a central recess 42 for receiving a trailing linking portion 44 of an adjacent leading module. The illustrative front end 34 is also curved to allow relative movement of linked modules, though the invention is not so limited. The main body 11 of the module 10 further includes front linking portions 50 comprising legs extending down from the bottom of the deck 30 on each side of the recess 42. The front linking portions 50 include aligned openings 52 configured to receive a hinge pin. The trailing linking portion 44 includes an opening 46 that aligns with the openings 52 of a rear module when the trailing linking portion 44 of a module is received in the opening 42 between the linking portions 50 of a rear module. A hinge pin may be inserted in the aligned openings 46, 52 to link adjacent modules together.

The magnet cover 60 allows integration of one or more magnetic elements 20 into the module to draw magnetically-attractive items to the top surface 38 or for another purpose, such as to draw the module towards or away from a carryway. The illustrative magnet cover 60 comprises two sections, 60a, 60b, each configured to mate with a front linking element 50 of the main body to sandwich a magnetic element 20 between the top deck 30 and the magnet cover 60. The magnet cover sections 60a, 60b are mirror-images of each other. Each magnet cover 60a, 60b includes a top surface 62 having a recess 63 configured to receive and seat a magnetic element 20.

Each magnet cover 60 includes a downward extending leg 64 that mates with a linking portion 50. Each leg 64 includes an opening 66 that aligns with the openings 52 to form a hinge passageway for receiving a hinge rod to secure the cover to the module body.

Figure 6:
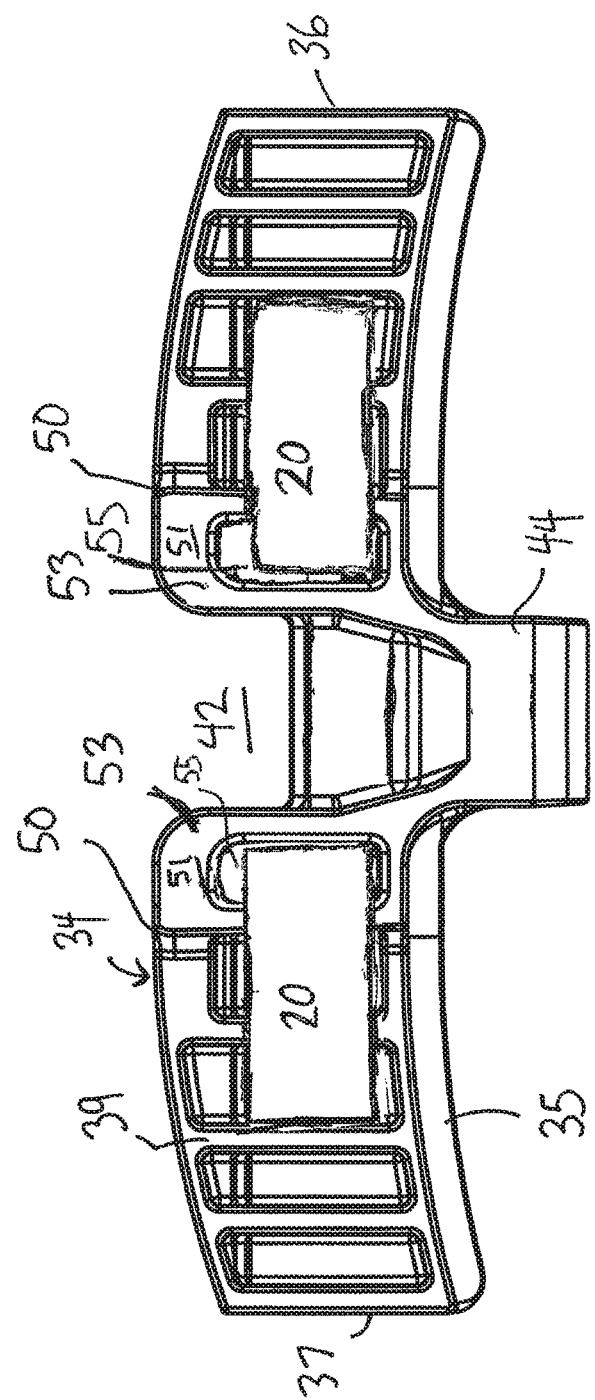
FIG. 6 is a bottom view of the main body of the magnetic conveyor belt module of FIG. 2 with a magnet inserted in place.
Figure 7:
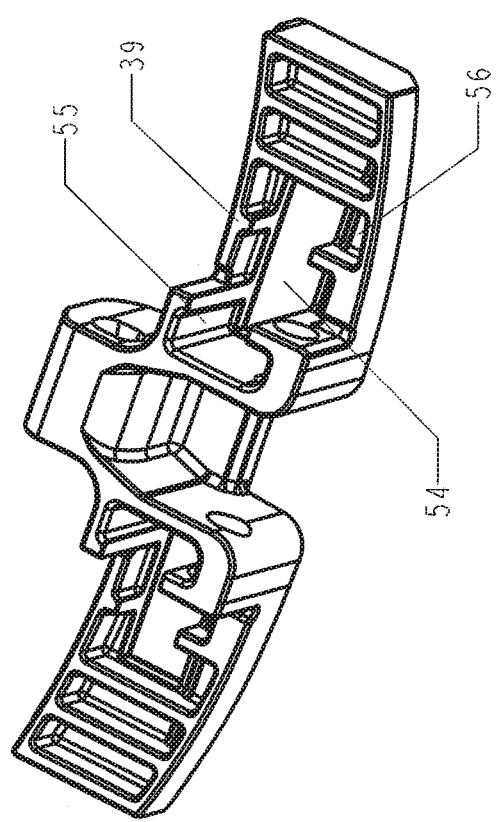
FIG. 7 is a bottom view of the magnetic conveyor belt module of FIG. 2, without the magnet.
Figure 8:
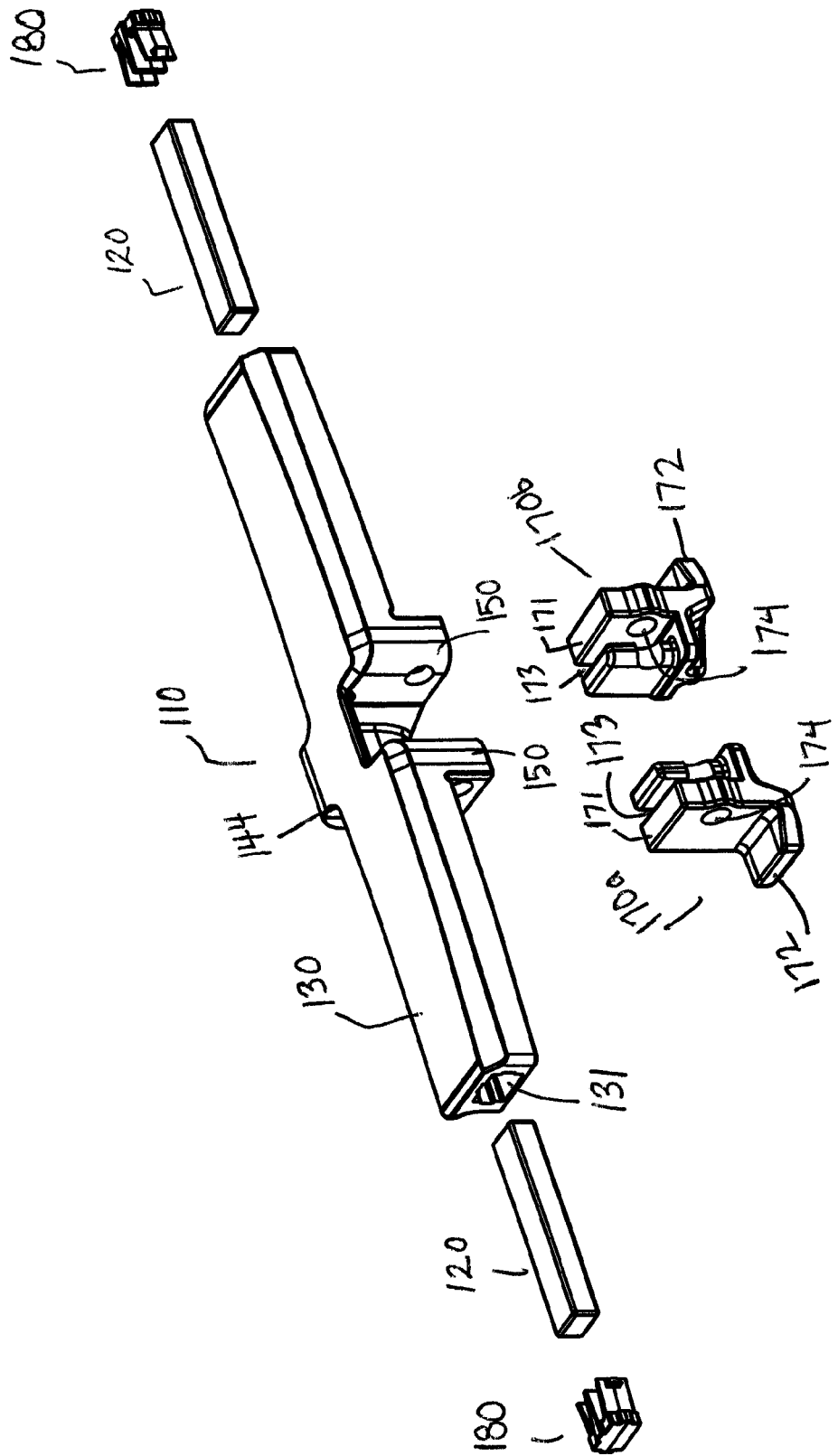
FIG. 8 is an exploded view of a magnetic conveyor belt module according to another embodiment of the invention.
Figure 9:
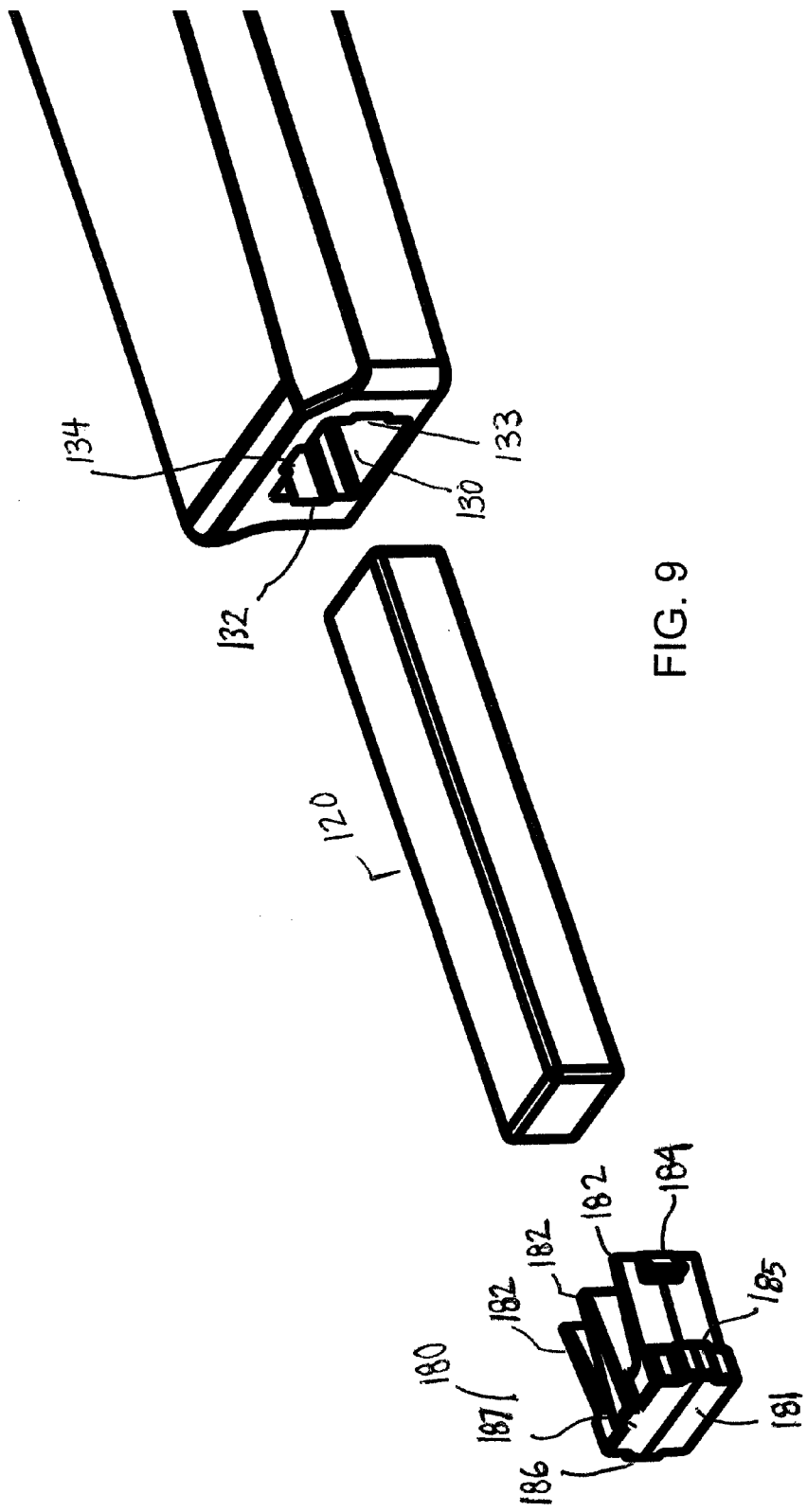
FIG. 9 is a close-up view of a portion of the magnetic conveyor belt module of FIG. 8.
Figure 10:
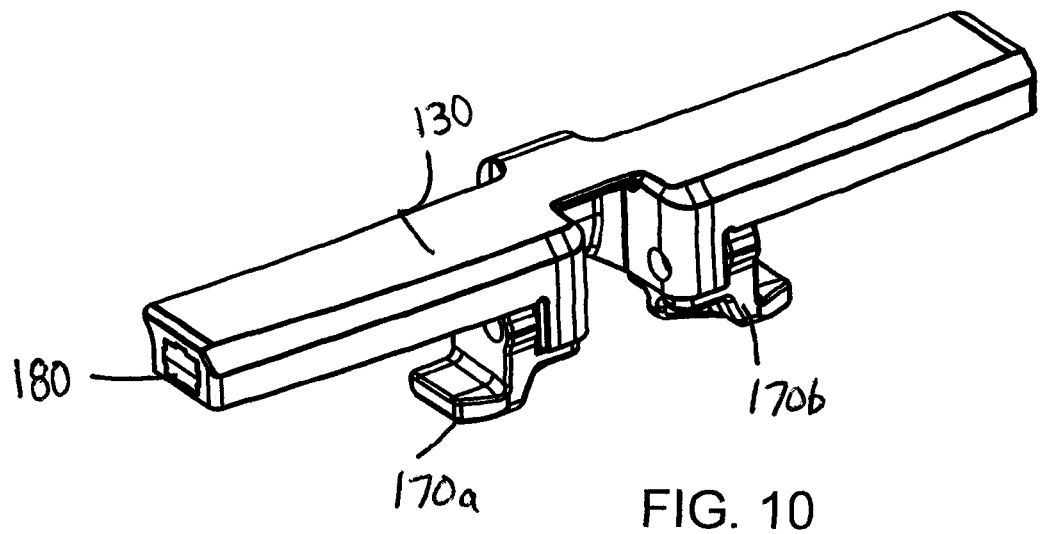
FIG. 10 is an isometric view of the assembled magnetic conveyor belt module of FIG. 8.
Figure 11:
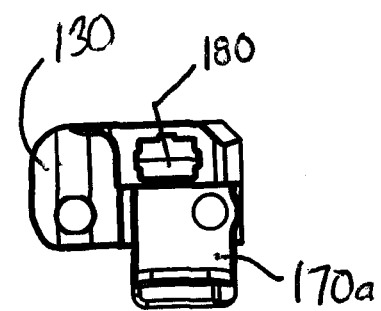
FIG. 11 is a side view of the magnetic conveyor belt module of FIG. 10.
Figure 12:
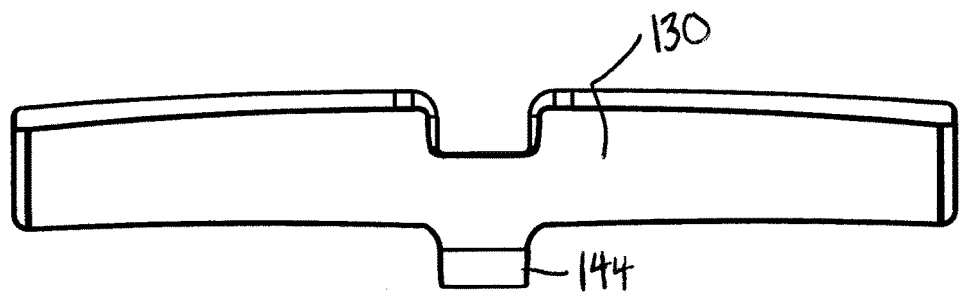
FIG. 12 is a top view of the magnetic conveyor belt module of FIG. 10.
Figure 13:
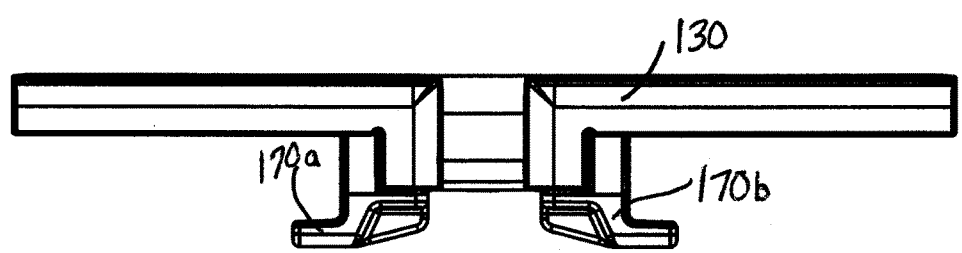
FIG. 13 is a front view of the magnetic conveyor belt module of FIG. 10.
Figure 14:
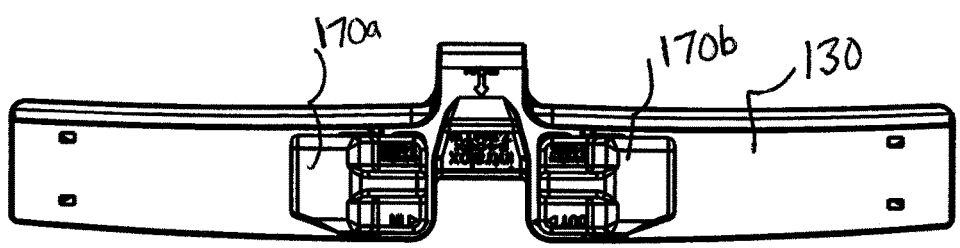
FIG. 14 is a bottom view of the magnetic conveyor belt module of FIG. 10.
Figure 15:
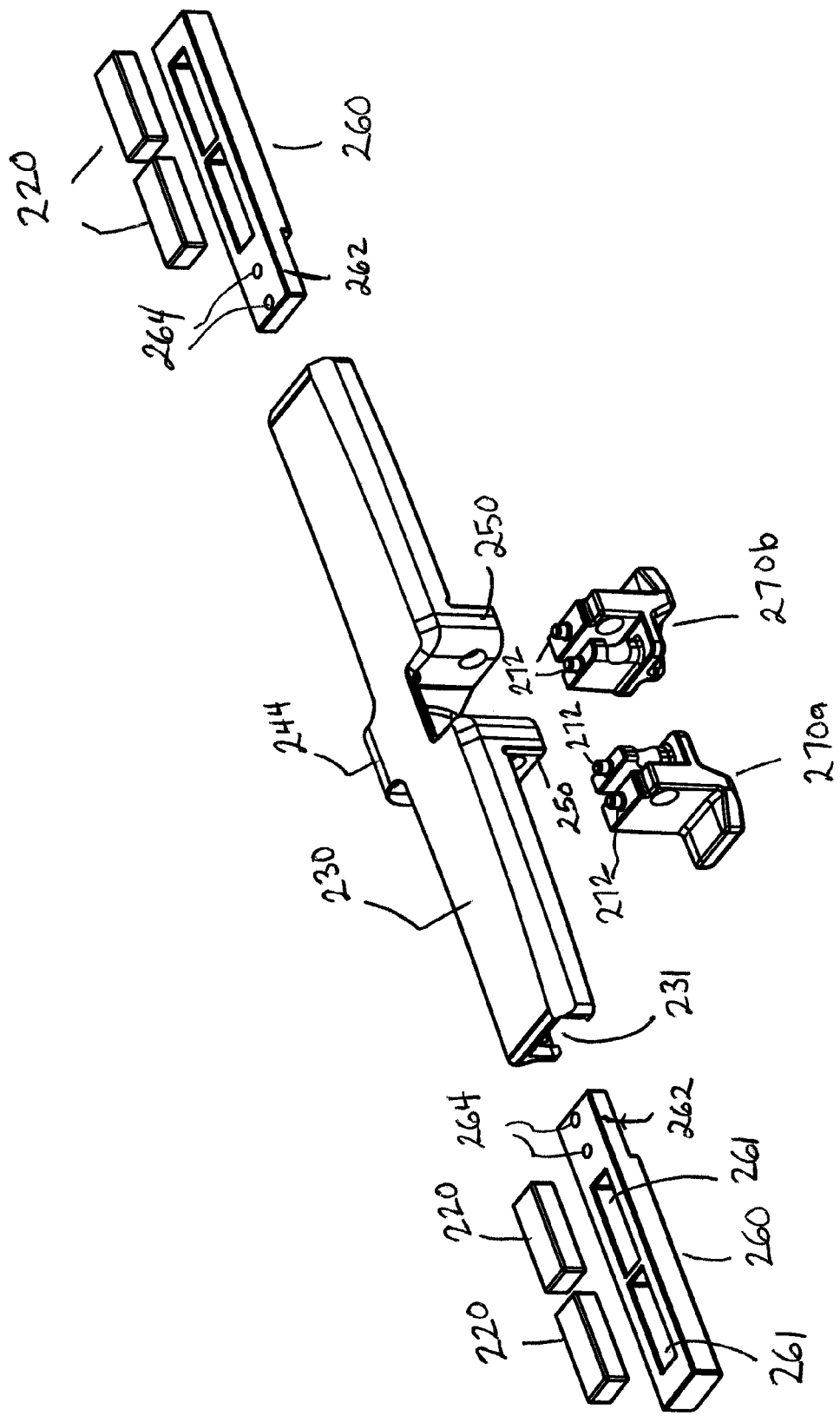
FIG. 15 is an exploded view of a magnetic conveyor belt module according to another embodiment of the invention.
Figure 16:
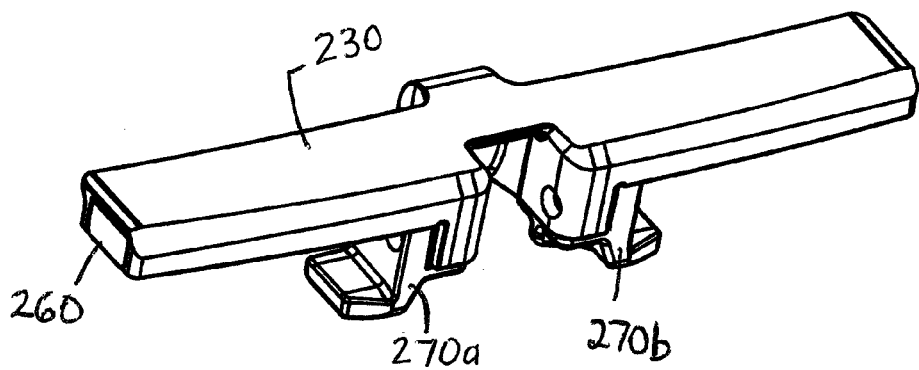
FIG. 16 is an isometric view of the assembled magnetic conveyor belt module of FIG. 15.
Figure 17:
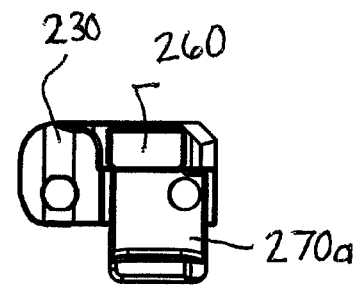
FIG. 17 is a side view of the magnetic conveyor belt module of FIG. 16.
Figure 18:
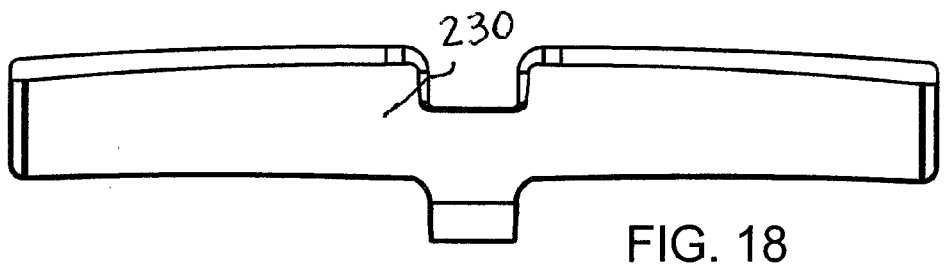
FIG. 18 a top view of the magnetic conveyor belt module of FIG. 16
Figure 19:
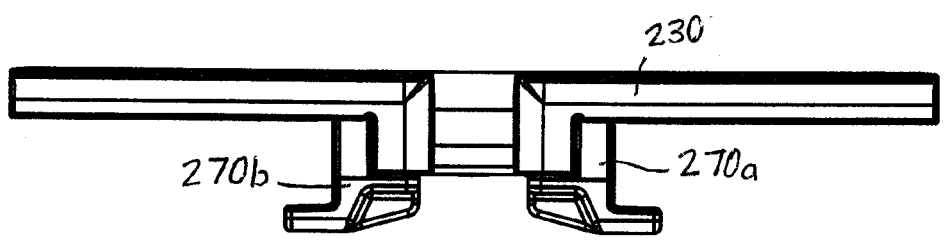
FIG. 19 is a rear view of the magnetic conveyor belt module of FIG. 16.
Figure 20:
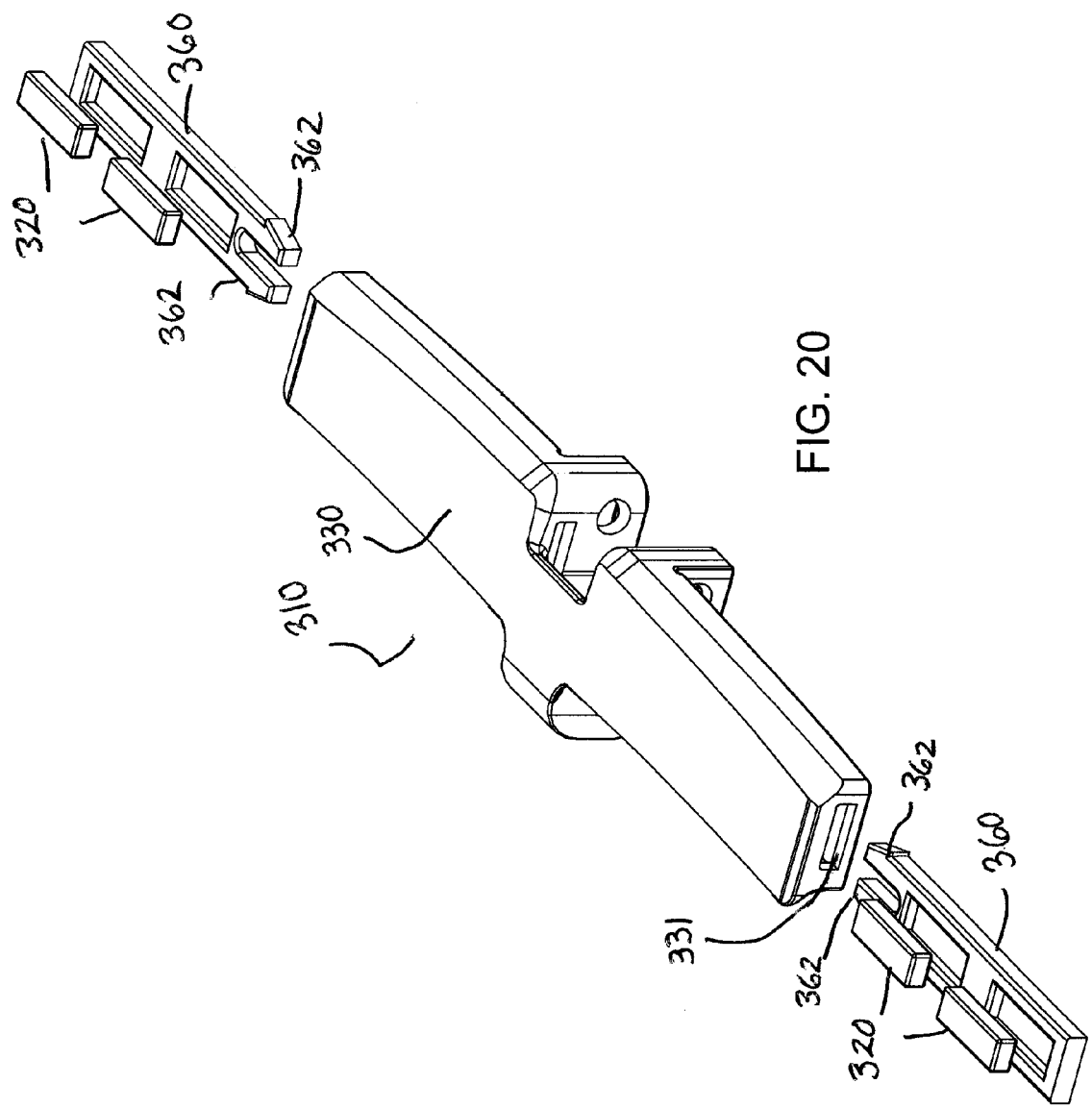
FIG. 20 is an exploded view of a magnetic conveyor belt module according to another embodiment of the invention.
Figure 21:
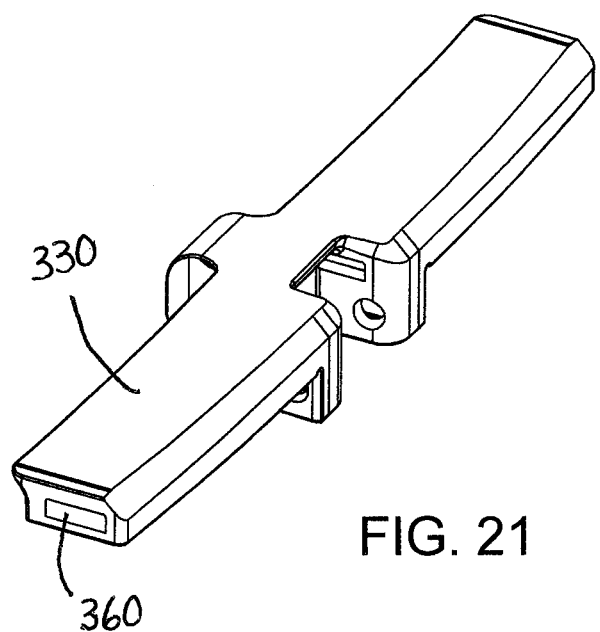
FIG. 21 is an isometric view of the assembled magnetic conveyor belt module of FIG. 16.
Figure 22:
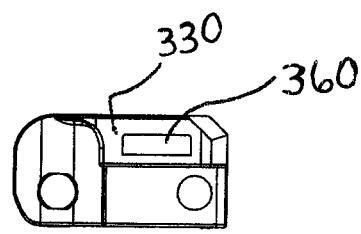
FIG. 22 is a side view of the magnetic conveyor belt module of FIG. 20.

As shown in FIGS. 6 and 7, each front linking portion 50 is hollow, comprising a central hollow 55 surrounded by a shell 53. The hollow 55 opens to the bottom surface 51 of the front linking portion. The deck bottom surface 39 may include a recess 54 extending into the hollow 55 that cooperates with the recess 63 in the corresponding magnet cover 60 to form a compartment for housing the magnet element 20. An intermediate surface 56 is formed within the deck 30 between the bottom surface 39 and the recess 54. The recess 54 is formed within the body of the deck, below the top surface 38 so that the top conveying surface remains unchanged and continuous even with the integration of the magnetic element. When the module is assembled, the top surface 62 of the magnet cover 60 abuts the intermediate surface 56 to form a closed magnet compartment for housing a magnetic element 20 between the recess 63 and recess 54. The magnet cover engages the seat 54 to secure the magnetic element therein.

Each leg 64 of the magnet cover includes a vertical, longitudinally-extending slot 65 to define a protrusion forming an insert 68 that is received in the hollow 55. The top of the insert forms a portion of the recess for the magnet element and the front of the insert includes a semi-circular recess 67 forming a portion of the hinge passageway. The slot 65 and space in front of the protrusion 68 form a shelf 69 for the bottom surface 51 of the linking portion, configured to interface with the shell 53. The slot 65 receives a wall of the shell 53 forming the front linking portion 50 when the magnetic module is assembled.

A hold-down tab 70 protrudes outward from the bottom of each leg 64. The hold-down tab 70 engages a feature in the carryway of the conveyor belt to prevent the conveyor belt from rising up during operation, and extends substantially parallel to the top deck 30 when the magnetic conveyor belt module 10 is assembled. The hold-down tabs 70 engage an inwardly flanged wearstrip on the side of the conveyor belt carryway to keep the belt from pulling up during operation. The hold-down tabs 70 can also be used to hold a conveyor belt in place when running upside down. In this case, the magnetic elements help retain products on the underside of the belt against the pull of gravity.

To assemble the magnetic conveyor belt module 10, the magnetic elements 20 are inserted in the recess 63 of the magnet covers 60, or in the recesses 54 below the deck 30. Then, the magnet covers 60a, 60b mate with the linking elements 50, so that the insert 68 is inserted in hollow 55 of the linking portion 50 and openings 52, 66 align. The magnetic elements 20 are held between the recess 54 in the bottom surface 39 of the deck 30 and the magnet covers 60a, 60b. Then a hinge rod or other holder is inserted in the hinge passageway formed by the openings 52, 66 to secure the magnet cover against the bottom surface of the deck, preventing the magnetic elements 20 from escape.

The modules are preferably made of thermoplastic polymers, such as polypropylene, polyethylene, acetal, nylon, or composite polymers in an injection-molding process. Plastic conveyor belt modules made in this way are available commercially from Intralox, L.L.C., of Harahan, La., USA. In another embodiment, the modules are formed of stainless steel or another suitable material.

A number of modules 10 are used to form a conveyor belt. The belt may comprise a series of rows of edge-to-edge belt modules. Modules of different lateral widths are used to construct the belt in a bricklay pattern. But wide modules extending the entire width of the belt could alternatively be used. The belt may comprise a combination of magnetic and non-magnetic modules. The rows are interconnected by the hinge rods extending laterally through the passageways formed by the aligned openings in the interleaved hinge eyes between adjacent rows. The belt conveys articles atop the conveying surfaces 38 of the modules along an upper carryway portion of the conveyor. The belt is trained around sprockets mounted on each end of the carryway, and returns along a return way below the carryway. The modules may be linked to form the belt after integration of the magnetic elements using the magnet covers, or simultaneous with the integration of the magnetic elements using the magnet covers.

FIGS. 8-14 show another embodiment of a magnetic conveyor belt module 110 or "link" suitable for forming a conveyor belt or "chain." The module 110 integrates a pair of magnetic elements 120 to facilitate conveyance of magnetically-attractive items. The module 110 includes lateral openings 131 extending from the side edges of and into the top deck 130 to form slots sized and configured to seat the magnetic elements 120. The lateral openings 131 extend into the body of the deck, below the top surface of the deck so that the top surface remains smooth and continuous. The top deck includes front and rear linking portions 150, 144, as described above. The module 110 further includes retainers, shown as insertable caps 180 for capping the lateral openings 131, to retain the magnetic elements within the top deck 130.

The illustrative caps 180 are self-retaining. In one embodiment, shown in FIG. 9, the caps 180 include flexible legs 182 extending from a main body 181. The flexible legs 182 can be compressed to allow insertion into the slots 131, and then spring back to secure the cap within the slot 131. The caps 180 can be molded from a detectable plastic material or comprise a cast metal insert to safeguard the end user in case the cap accidently comes out.

In the illustrative embodiment, the slots 131 include recesses in the top wall and side walls to facilitate retention of the caps 180. The illustrative recesses 132, 133, 134 are rectangular, with squared corners, though the invention is not so limited. The caps 180 include tabs configured to interface with the recesses. For example, the outer legs include tabs 184 that are received in the side recesses 132, 133. The side tabs 184 have angled outer walls to facilitate insertion. The main body 181 of the cap includes a top protrusion 187 that is received in the top recess 134, and side protrusions 185, 186 that fit in the side recesses 132, 133. The illustrative bottoms of the slots 131 and caps 180 are flat, though the invention is not so limited.

The module 110 further includes hold-down tab portions 170a, 170b coupled to the top deck portion 130. Each hold-down tab includes a main body 171 that couples to a front linking element 50 and a perpendicular tab portion 172 extending laterally outwards from the main body 171.

The hold-down tab portions 170a, 170b are mirror-images of each other. The main bodies 171 include a channel 173 and hinge openings 174 for mating with a front linking element of the top deck 130. The hold-down tab portions 170a, 170b are retained against the top deck portion 130 using a hinge rod inserted through the hinge openings of the top deck and hold-down tab portions.

FIGS. 15-19 show another embodiment of a magnetic conveyor belt module 210 or "link" suitable for forming a conveyor belt or "chain." The module 210 integrates two pairs of magnetic elements 220 to facilitate conveyance of magnetically-attractive items or for another purpose. The module 210 includes lateral, open slots 231 extending inwards from the side edges of the top deck for seating the magnetic elements. The slots 231 are open to the bottom of the top deck 230 but below the top surface of the deck, so that the top deck remains smooth and continuous. The top deck includes front and rear linking portions 250, 244, as described above. The module 210 further includes magnetic element carriers 260 sized and configured to fit in the lateral, open slots 231. Each carrier 260 comprises a main body having top recesses 261 for receiving and seating a magnetic element 220.

The carriers 260 include retainers for retaining the carriers within the top deck. In the embodiment of FIGS. 15-19, the inner portion 262 of each carrier is configured to engage a hold-down tab portion 270a or 270b coupled to the top deck to retain the carrier and magnetic elements 220 in the slot 231. For example, the illustrative inner portions 262 each have a stepped up bottom surface and vertical openings 264 extending through the body from the stepped up bottom surface to the top surface of the carrier. The hold-down tab portions 270a, 270b are configured similar to the hold-down tabs 170a, 170b, except they also include top prongs 272, configured to be inserted in the vertical openings 264 when the hold-down tabs are coupled to the top deck portion 230 to retain the magnetic element carriers 260 in place. Once a hinge rod is inserted through aligned openings to secure the hold-down tab portions 270a, 270b to the top deck 230, the magnetic element carriers become fixed to the top deck 230 as well.

FIGS. 20-23 show another embodiment of a magnetic conveyor belt module 310 or "link" suitable for forming a conveyor belt or "chain." The module 310 integrates a two pairs of magnetic elements 320 to facilitate conveyance of magnetically-attractive items or for another suitable purpose. The module 310 includes lateral slots 331 in a top deck 330 for seating a magnetic element. The lateral slots extend into the body of the top deck from the side edges, below the deck's top surface. The top deck 330 includes front and rear linking portions 350, 344, as described above. The module 310 further includes magnetic element carriers 360 sized and configured to fit in the lateral slots 331.

Figure 23:
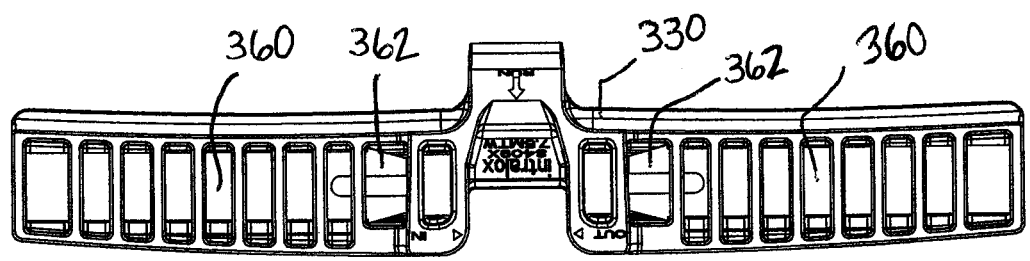
FIG. 23 is a bottom view of the magnetic conveyor belt module of FIG. 20.

Each carrier 360 comprises a main body having top recesses 361 configured to each receive and seat a magnetic element 320. The illustrative carriers 360 are self-retaining, though a separate retainer may alternatively be used. The inner end of the illustrative carrier 360 includes barbed, flexible legs 362 forming a self-retaining feature to secure the housed magnetic elements in the module 310. The barbed, flexible legs 362 compress to allow insertion of the carrier 260 through the slot 331. The legs 362 spring open against the side walls of the slot or against a stop within the slot 331 to prevent the carrier from moving back out of the slot, as shown in FIG. 23. One or more hold-down portions (not shown) may be coupled to the top deck 330, as described above.

Figure 24:
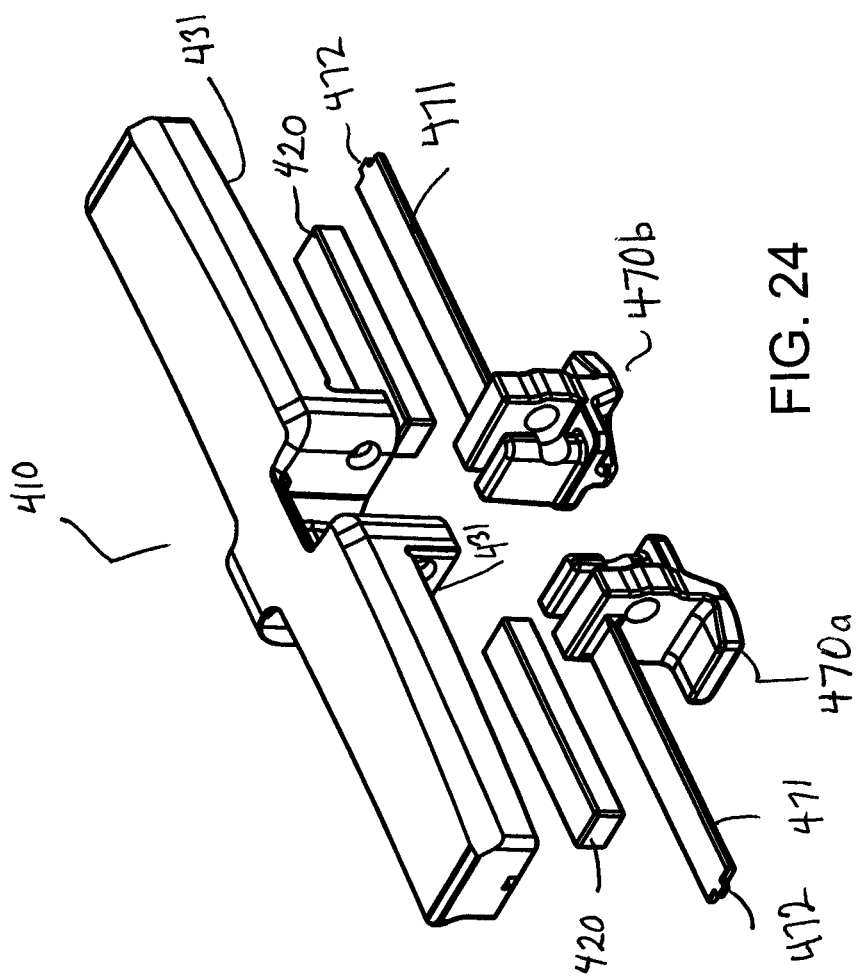
FIG. 24 is an exploded view of a magnetic conveyor belt module according to another embodiment of the invention.

FIG. 24 shows still another embodiment of a show another embodiment of a magnetic conveyor belt module 410 or "link" suitable for forming a conveyor belt or "chain." The module 410 integrates magnetic elements 420 to facilitate conveyance of magnetically-attractive items or for another suitable purpose. The module 410 includes laterally-extending recesses 431 in the bottom surface of the top deck, below the top conveying surface, for receiving and seating a magnetic element. Each recess 431 includes a primary recess sized and configured to seat a magnetic element and an end nook. The bottom hold-down tab portions 470*a*, 470*b* each include a cover 471 for the corresponding magnetic element. The cover includes an end tab 472 configured to be received in the end nook of the slot 431. When the hold-down tab portions 470*a*, 470 are coupled to the top deck and the hinge rod is inserted through the hinge openings, the cover 471 securely covers the magnetic element 420 within the slot 431.

Figure 25:
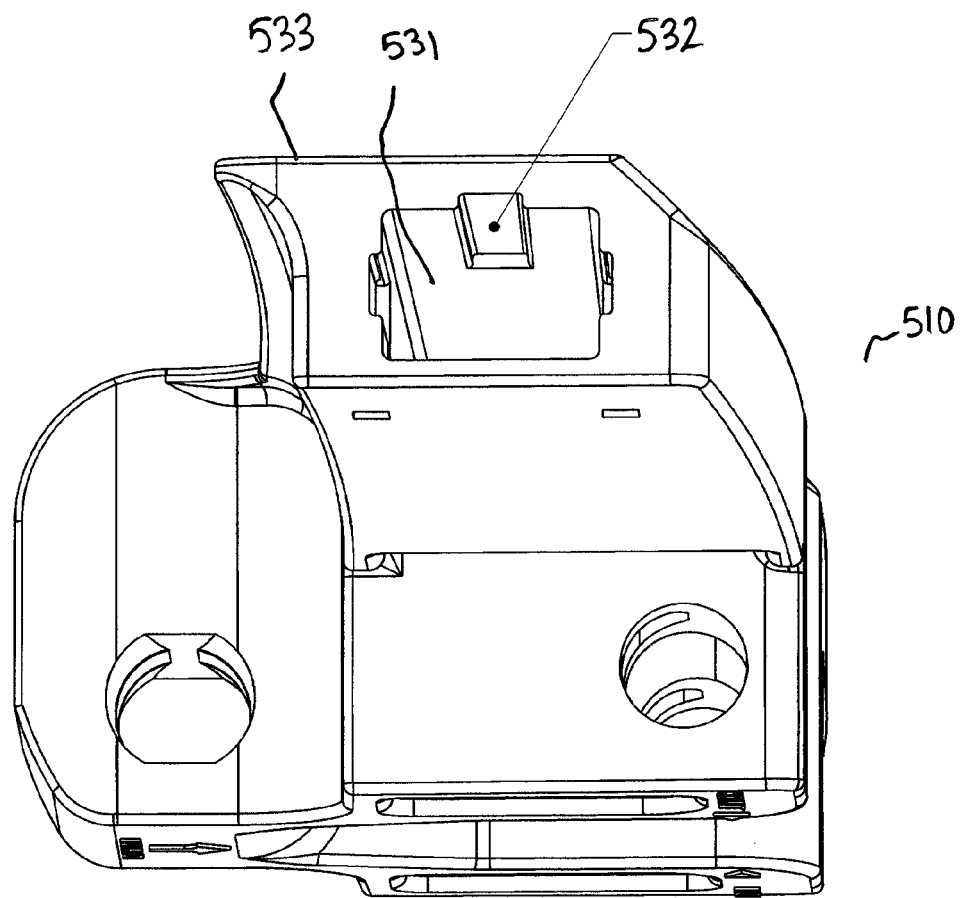
FIG. 25 is a lower side view of a magnetic conveyor belt module including a wear window in a seat for a magnetic element.

A magnetic conveyor belt module that integrates a magnetic element to facilitate conveyance of magnetically-attractive items can include a wear window. For example, FIG. 25 shows an embodiment of a magnetic conveyor belt module 510 including a slot 531 forming a seat for a magnetic element. The slot may directly seat a magnetic element or seat a carrier housing a magnetic element. The top of the slot includes a recess 532 forming a wear window. As the top surface 533 of the module wears down, the window 532 will be exposed before the seated magnetic element. This can alert the user that it is time to replace the module before allowing the magnetic element to become fully exposed and potentially come out of the module.

Figure 26:
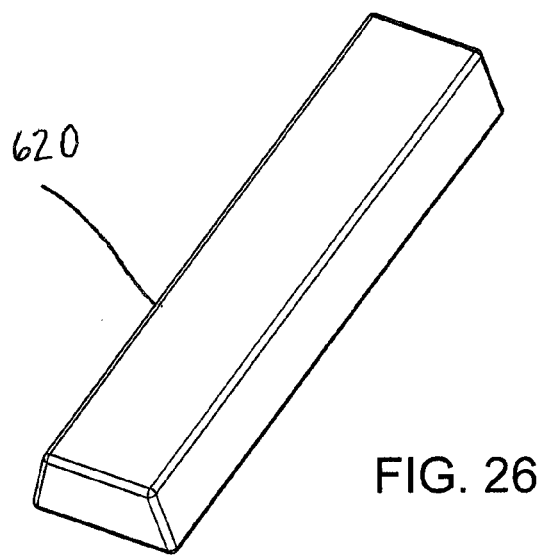
FIG. 26 is an isometric view of a trapezoidal magnetic element suitable for use with a magnetic conveyor belt module according to an embodiment of the invention.

The magnetic carrier and receiver in the module for receiving the magnetic carrier can have any suitable size, shape and configuration. For example, according to another embodiment of the invention shown in FIG. 26, a magnetic element 620 may have a trapezoidal cross-section, with a thinner top than bottom. The trapezoidal magnetic element is seated in a trapezoidal recess or other magnetic element seat in the module. The trapezoidal shape of the magnetic element prevents the magnetic element from coming out once the top surface of the module has worn through and the magnetic element is exposed. This way, even if the magnetic element is exposed, the undercut prevents the magnetic element from escaping the module.

In another embodiment of the invention, the module comprises magnetizable material that is added during formation of the module using injection molding. The magnetizable material can be magnetized within the mold to incorporate a magnetic element into the conveyor belt module. In one embodiment, a cover may be molded from a magnetizable plastic, and then inserted into or overmolded onto a module body. The magnetizable plastic may then be magnetized to integrate a magnetic element to a conveyor belt module.

Although the invention has been described in detail with reference to a few exemplary versions, other versions are possible. The scope of the claims is not meant to be limited to the versions described in detail.

What is claimed is:

1. A conveyor belt module, comprising:
    a top deck extending longitudinally in the direction of belt travel from a first end to a second end, laterally from a first edge to a second edge and in thickness from a top surface to an opposite bottom surface, and including a lateral opening extending laterally inwards from the first edge into the top deck, the lateral opening having a top wall that is below the top surface of the top deck so the top surface of the top deck remains smooth and continuous;
    a magnetic element inserted in the lateral opening; and
    a cap having a main body and flexible legs inserted in the lateral opening to cap the lateral opening and retain the magnetic element in the top deck.

2. The conveyor belt module of claim 1, wherein the magnetic element has a trapezoidal cross-section.

3. The conveyor belt module of claim 1, wherein the lateral opening includes a top recess forming a wear window.

4. The conveyor belt module of claim 1, further comprising a linking element extending down from the bottom surface of the top deck, the linking element including a hinge opening for receiving a hinge rod.

5. The conveyor belt module of claim 1, wherein the lateral opening includes recesses in the top wall and a side wall and the main body of the cap includes protrusions that fit in the recesses.

6. The conveyor belt module of claim 5, wherein the flexible legs include at least one tab received in a recess in the side wall, the tab having an angled outer wall.

7. A conveyor belt module, comprising:
    a top deck extending longitudinally in a direction of belt travel from a first end to a second end, laterally from a first edge to a second edge and in thickness from a top surface to an opposite bottom surface;
    a slot extending laterally into the top deck from the first edge, the slot having a top wall that is below the top surface of the top deck so the top surface of the top deck remains smooth and continuous;
    a magnetic element inserted in the slot; and
    a self-retaining retainer inserted in the slot for preventing escape of the magnetic element from the slot, the self-retaining retainer including barbed flexible legs that engage a feature in the slot to prevent movement of the self-retaining retainer from the slot.

8. The conveyor belt module of claim 7, wherein the self-retaining retainer comprises a cap sized and configured to be inserted in the slot.

9. The conveyor belt module of claim 7, wherein the self-retaining retainer comprising a magnet carrier inserted in the slot holding the magnetic element.

10. A conveyor belt module, comprising:
    a top deck extending longitudinally in a direction of belt travel from a first end to a second end, laterally from a first edge to a second edge and in thickness from a top surface to an opposite bottom surface;
    a slot extending laterally into the top deck from the first edge, the slot having a top wall that is below the top surface of the top deck so the top surface of the top deck remains smooth and continuous;
    a magnet carrier including a magnetic element seated therein inserted in the slot, an inner portion of the magnet carrier comprising a stepped up bottom surface and vertical openings extending through the magnet carrier;
    a linking portion extending down from the first end of the top deck, the linking portion comprising a central recess and legs extending down from the bottom surface on each side of the central recess, the legs including aligned hinge openings; and a hold-down tab portion coupled to the linking portion for retaining the magnet carrier in the slot, the hold down tab portion including a leg with a hinge opening that aligns with the hinge openings of the linking portion, a hold-down tab extending laterally outward from the leg and top prongs configured to be inserted in the vertical openings of the magnet carrier.

11. A conveyor belt module, comprising:

a top deck extending longitudinally in the direction of belt travel from a first end to a second end, laterally from a first edge to a second edge and in thickness from a top surface to an opposite bottom surface, and including a seat below the top surface for receiving a magnetic element;

a first linking portion extending down and out from the first end and including a hinge opening;

a second linking portion extending down from a second end of the top deck, the second linking portion comprising a central recess for receiving a first linking portion of an adjacent module and legs extending down from the bottom surface on each side of the central recess, the legs including aligned hinge openings;

a magnet seat comprising a recess formed in the bottom surface of the top deck;

a magnetic element inserted in the magnet seat; and at least one hold-down tab portion coupled to the second linking portion, the hold-down portion including a leg with a hinge opening that aligns with the hinge openings of the second linking portion and a hold-down tab extending laterally outward from the leg, the hold down portion having an upper recess that cooperates with the recess in the bottom surface of the top deck to form a compartment for housing the magnetic element.

12. The conveyor belt module of claim 11, wherein the magnet seat includes a top wear window.

13. The conveyor belt module of claim 11, wherein the magnetic element has a trapezoidal shape.

* * * * *